(12) United States Patent
Vinecombe

(10) Patent No.: US 9,640,091 B2
(45) Date of Patent: May 2, 2017

(54) CARD

(76) Inventor: Barbara Jean Vinecombe, South Perth (AU)

( * ) Notice: Subject to any disclaimer, the term of this patent is extended or adjusted under 35 U.S.C. 154(b) by 0 days.

(21) Appl. No.: 13/597,190

(22) Filed: Aug. 28, 2012

(65) Prior Publication Data
US 2013/0302540 A1 Nov. 14, 2013

(51) Int. Cl.
| | | |
|---|---|---|
| G09F 1/06 | (2006.01) |
| G09F 1/02 | (2006.01) |
| B32B 7/04 | (2006.01) |
| B42D 15/04 | (2006.01) |
| G09F 1/08 | (2006.01) |

(52) U.S. Cl.
CPC ............... *G09F 1/06* (2013.01); *B32B 7/04* (2013.01); *B42D 15/042* (2013.01); *G09F 1/08* (2013.01)

(58) Field of Classification Search
None
See application file for complete search history.

(56) References Cited

U.S. PATENT DOCUMENTS

| | | | | |
|---|---|---|---|---|
| 1,767,753 A | * | 6/1930 | Freiberg | 248/459 |
| 2,110,784 A | * | 3/1938 | Wolfson | 40/539 |
| 2,170,953 A | * | 8/1939 | Spots | 446/388 |
| 2,205,262 A | | 6/1940 | Hayes | |
| 2,616,199 A | | 11/1952 | Robins | |
| 2,696,690 A | | 12/1954 | Bender | |
| 2,704,910 A | * | 3/1955 | Paige | 446/388 |
| 3,134,708 A | | 5/1964 | Lohnes | |
| 3,212,214 A | * | 10/1965 | Patterson | 446/388 |
| 3,571,958 A | | 3/1971 | Stevens | |
| 5,782,452 A | * | 7/1998 | Bosworth | 248/459 |
| 5,933,989 A | | 8/1999 | Volkert | |
| 6,173,515 B1 | | 1/2001 | Walsh | |
| 7,100,317 B1 | | 9/2006 | Strong | |
| 7,316,085 B1 | | 1/2008 | Freeman | |
| 7,409,787 B2 | | 8/2008 | Glenn | |
| 7,490,425 B2 | | 2/2009 | Crowell et al. | |
| 7,596,896 B2 | | 10/2009 | Crowell et al. | |

OTHER PUBLICATIONS

Martha Stewart Living Magazine Dec. 2000 Issue p. 90, "Paper Plate Angels".
Sylvan (http:crafts.kaboose.com/angel-and-singer-ornaments.htm and http:kidsdomain.com/craft/cegif/orn/ang-hom.gif), Copyright 1995-1999.

* cited by examiner

*Primary Examiner* — David Sample
*Assistant Examiner* — Nicole T Gugliotta

(57) ABSTRACT

An article such as a greeting card (10) comprising a sheet (11) defining at least one central portion (16) and at least one versatile portion (18) connected together via at least one fold (20). The central portion (16) has two opposing edges (26, 28) adapted to be drawn together to create a three-dimensional form. The fold (20) is located at a junction of the central portion (16) and versatile portion (18). These portions (16, 18) are foldably connected together whereby the versatile portion (18) can be folded and adapted for location adjacent to or at an angle to the three-dimensional form, and may be secured at that location. The greeting card (10) may further comprise numerous engagement means (30, 32), apertures (38) and cords (39). The greeting card (10) can be delivered in a collapsed condition and can be readily assembled into a three-dimensional form revealing the ingenuity of the card.

10 Claims, 7 Drawing Sheets

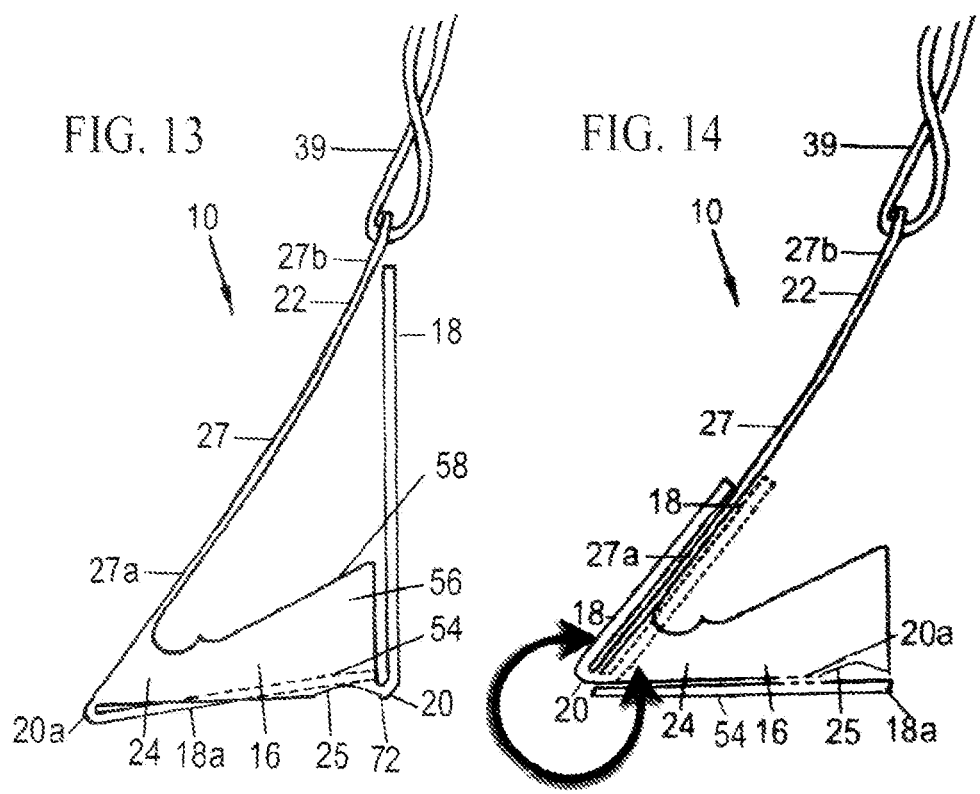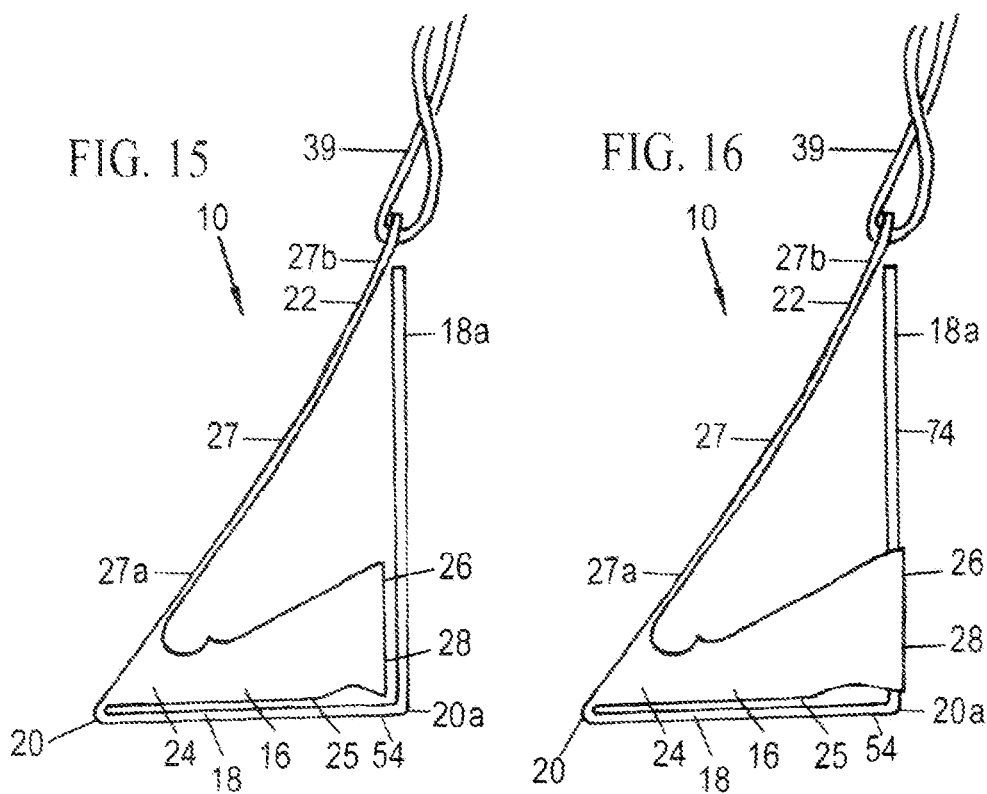

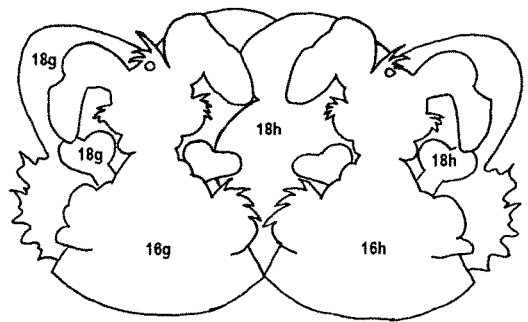
FIG. 23
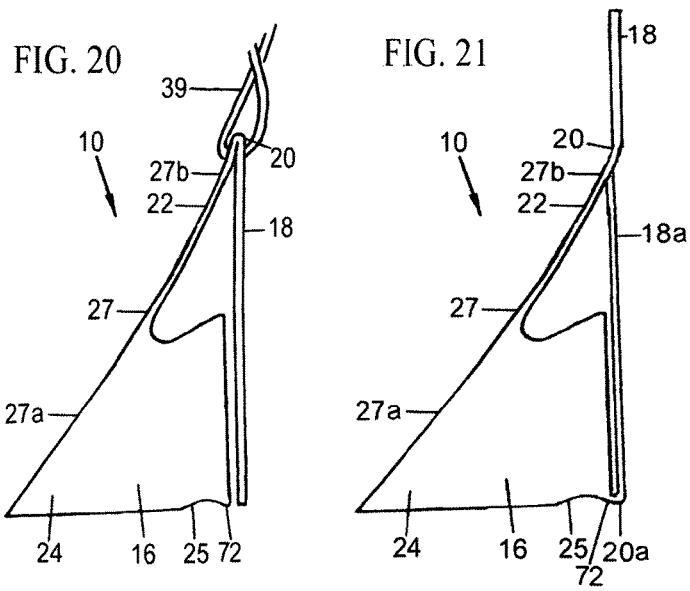
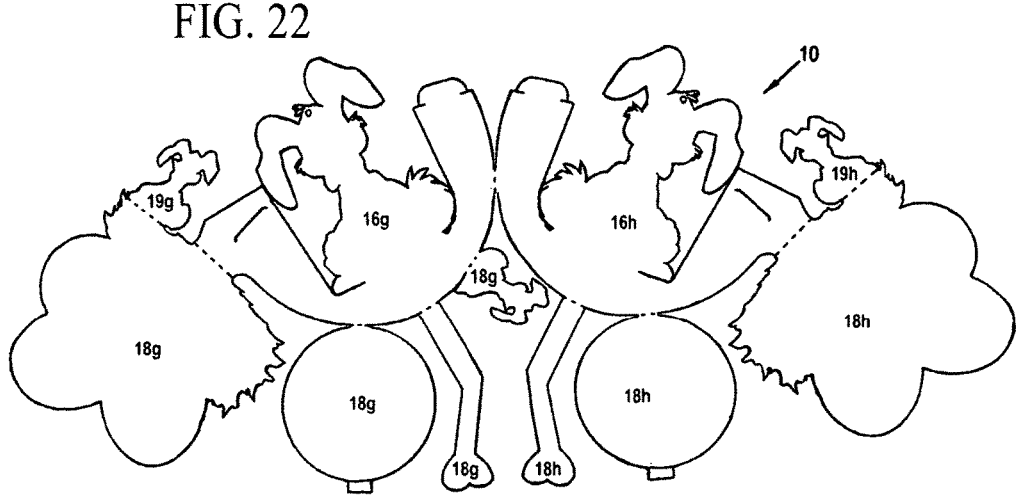
FIG. 22

CARD

PRIORITY

This application claims priority of U.S. patent application Ser. No. 11/654,125 filed Jan. 16, 2007.

FIELD OF THE INVENTION

The present invention relates to an article that can transform from a collapsed condition, which is generally flat, into an erected condition that has a three-dimensional form, and can transform back to its collapsed condition.

The article may be used for any appropriate purpose such as, for example, a greeting card to convey a greeting message or other information; a decoration; a gift; a souvenir; an ornament; a puzzle; entertainment; a table name card; an educational tool; promotional tool or display device for advertising or conveying other information.

BACKGROUND ART

The discussion of the background art is included exclusively for the purpose of providing a context for the present invention. It should be appreciated that the discussion is not an acknowledgement or admission that any of the material referred to was common general knowledge in the field relevant to the present invention in Australia or elsewhere before the priority date.

It is known that on special occasions or as a sign of affection, greeting cards may be given by one person known as the sender, to another person known as the recipient. Such greeting cards are normally manufactured in a booklet style such that the front cover incorporates a design, message, photograph or a combination of these. The booklet style greeting card may be folded flat, placed in an envelope and sent by mail to the intended recipient; generally, when received, the recipient knows beforehand what is inside the envelope before opening it. There is no anticipation, wonder, excitement or surprise factor: a greeting card is a greeting card. The booklet style greeting cards are normally displayed by the recipient for a short period of time.

In recent times attempts have been made to add excitement and life to greeting cards by the introduction of pop up cards and three dimensional greeting cards The greeting card has virtually stagnated, being, consistently similar and consistently familiar. It is what it is and has remained so for approx 650 years.

The booklet style greeting card generally is often difficult to display and when the greeting card is displayed, only the front cover or the inside cover or page are displayed and a slight breeze will topple them off the furniture.

There have been various proposals to enhance the sentiment or interest engendered by greeting cards through a provision enabling them to be assembled into a three-dimensional form for display.

Besides U.S. patent application Ser. No. 11/654,125, Australian Paten Application No. 2008207283, Chinese Patent Application No. 200880008541.1, Mexican Patent Application No. MX/a/2009/007621, Brazilian Patent Application No. P1000806769-4, Indian Patent Application No. 1536/MUMNP/2009, and PCT application no. AU2008/000039, examples of such proposal are disclosed in U.S. Pat. Nos. 2,616,199, 2,696,690, 3,134,708, 3,571,958, 6,173,515, 7,596,896 B2, 7,490,425 B2, 7,409,787 B2, 7,316,085 B1, 5,933,989, 526,172; U.S. Pat. No. 7,100,317 and Martha Stewart Living Magazine December 2000 Issue pg 90, "Paper Plate Angels", H. Hayes (U.S. Pat. No. 2,205,262 (also Re. 22,109) and Sylvan (http:crafts.kaboose.com/angel-and-singer-ornaments.htm http://www.kidsdomain.com/craft/cegif/orn/ang-horn.gif)

While some such proposals may be effective in creating interest and allowing display in the three-dimensional form, they can be rather complicated to erect and/or not sufficiently stable when in the erected condition for display purposes. A greeting card should be ever evolving and always presenting new options for the sender and excitement to the recipient. The present invention provides for greater remembrance of the sender upon the greeting card being received, and long after other kind of greeting cards are stored or thrown away. Businesses and corporations can have their own individual style in their communications/advertisements to their customers customized in greeting card of the invention designed to their specification and with the same aforementioned qualities.

The present invention seeks to overcome at least in part the aforementioned disadvantages or limitations of the prior art and provide innovative advancements and useful choices to the prior art arrangements referred to above.

When the article is being purchased, the buyer may choose from a range of characters, scenes, sports, etc, and words in most languages. There are also variant degrees of simplicity, creativity, intrigue, interactivity and complexities to choose from. These options are created by the different designs and art used, layout and number of the portions, hinges, spaced engagements means, adhering means, apertures and cords. By mixing these coordinates and strategically adding and removing some, the arrangements are always different. As the coordinates are folded into place, the coordinated art work is then appreciated.

The article in its simplest form requires only a bend, a flip and a stick to realize its three dimensional form. It is simple, yet, intriguing. There is also anticipation, wonder, excitement, creativity, interactivity and it has a surprise factor. Prior to the complete erection of the article into the simple or the more complex three dimensional form, it is not known what the article will look like, inducing the recipient to experience unexpected emotions as mentioned above. The article in its more complex form varying degrees of challenge to skills, interactivity, ingenuity and mental fortitude to fathom and erect the numerous coordinates into the three dimensional form. The article can be hung, adhered to a support or sat upon a suitable surface. A weight may be applied so that the greeting card can sit in any breezy position in the home or office.

DISCLOSURE OF THE INVENTION

This application is a continuation-in-part of application Ser. No. 11/654,125 filed on Jan. 16, 2007.

According to a first aspect of the invention there is provided an article comprising a single flat sheet of material defining at least two portions, a first portion and a second portion. The first portion defines a central portion and the second portion defines a versatile portion foldably connected together via a fold, the central portion being adapted for erection into a three dimensional form and the versatile portion being adapted for location adjacent to or at an angle to the said erected three-dimensional form. In an alternative arrangement, the article can comprise one or numerous central portions, one or numerous versatile portions and one or numerous folds.

Preferably, the central portion comprises opposed second and third edges adapted to be drawn together to create the three-dimensional form. The central portion further comprises a first edge defining a bottom end when the central portion is erected into the three-dimensional form, with the first edge terminating at the second and third edges of the central portion. In this arrangement, the central portion can be turned upon itself to bring the two opposed second and third edges together Preferably, the lower end of the erected three dimensional form has a curved periphery so that the central portion has a generally inverted cone shape. The curved periphery can consist of numerous straight lines.

Preferably, the first edge comprises a first edge portion and a second edge portion. The first edge portion is at one end of the first edge, and the second edge portion is at the extreme other end of the first edge. The first edge portion is located at the junction of the first edge and the third edge, and the second edge portion is located at the junction of the first edge and the second edge. The central portion is erected into the three-dimensional form when the first edge portion and the second edge portion are brought together. The first and second edge portions are a first distance apart when the central portion is flat, and are a second distance apart, shorter than the first distance, when the central portion is erected into the three-dimensional form.

Preferably, the central portion has a lower end and an upper end, wherein the upper end is provided with spaced first and second engagement means, such that upon the central portion being drawn upon itself, the first and second engagement means are inter-engaged to secure the central portion in the three-dimensional form.

The first engagement means can comprise a tab, and the second engagement means can comprise a slot configured to receive the tab. The tab can be notched so that upon engagement between the tab and the slot, a part of the tab is located behind the portion adjacent the slot. The spaced first and second engagement means can also comprise forms of engagement means other than a tab and a slot. In alternative arrangements, engagement means can also comprise other forms of engagement means. In an alternative arrangement, spaced first engagement means can be on any portion and spaced second engagement means can be on any portion.

Preferably, the central portion comprises at least two sections, parts of the sections being integrally connected, with further parts of the sections being detached, whereby one of such sections projects from another of such sections when the central portion is erected into the three-dimensional form. In this arrangement, the central portion, when in the three-dimensional form, can portray a body having a torso and a head, with one section forming the head and upper part of the torso, and another section forming the lower part of the torso.

In an alternative arrangement, sections of the body can extend widthwise tout least the width of the central portion when the central portion is in the two dimensional flat form and extend to at least the height of the central portion when the central portion is in the two dimensional flat form. In an alternative arrangement, as illustrated in FIG. 17, the central portion when in the three-dimensional form can portray lower floors of a building. In an alternative arrangement, as illustrated in FIG. 18, the central portion when in the three-dimensional form can portray an entire building.

Conveniently, the central portion is cut to produce at least two sections at the same time as the sheet stock is cut to produce the sheet of the required configuration.

Preferably, the central portion comprises the first edge and the slot, and therebetween is located a heel section. When the central portion and versatile portion are in the three dimensional form, and resting on a support surface, the heel section provides balance and stability for the three dimensional form. Dimensions of the heel section can be varied to suit balance and stability requirements of alternative arrangements, with the first edge conforming accordingly.

Preferably, the fold foldably connects the versatile portion to the central portion. In alternative arrangements, any central portion(s) can be connected to further central portion(s) via a fold; the any central portion(s) can be connected to versatile portion(s) via a fold; any versatile portion(s) can be connected to further versatile portion(s) via a fold. In an alternative arrangement each portion can consist of one or numerous folds.

Preferably, the versatile portion is foldably connected to the central portion via the fold, and is adapted to be folded into a position adjacent to or at an angle to the central portion when in the erected three-dimensional form.

In alternative arrangements, the versatility of the versatile portion allows the versatile portion to adapt itself to various names and roles including, but not limited to, a background, a foreground, internal portion (74), a side, a top and a base (54) to define a particular application adopted by the versatile portion. Versatile portions, in their given adopted names, are adapted to be folded to a position adjacent to or at an angle to further versatile portion(s) and to further central portion(s).

A versatile portion, in the role of internal portion, as seen in FIG. 7 (74), is adapted to be folded to a position adjacent to or at an angle to the rear side of the central portion prior to the central portion being erected into the three dimensional form.

In an alternative arrangement, the versatile portion can be at least the same size of the central portion.

In alternative arrangement as illustrated in FIG. 16, versatile portion 18 in the role of a base, and 18*a* in the role of internal portion, are adapted to be folded to a position adjacent to or at an angle to the bottom end and to the rear side of the central portion prior to the central portion being erected into the three dimensional form.

Preferably, the versatile portion is adapted to be secured to the three-dimensional form. Adhering means, such as but not limited to glue, double sided tape, can be provided for securing the versatile portion to the three-dimensional form.

In an alternative arrangement, adhering means can be provided for securing any portion to any portion. Adhering means can be provided for securing part of a portion to itself.

In an alternative arrangement, the article can comprise one or numerous central portions, versatile portions, folds, spaced first engagement means, spaced second engagement means, aperture 38, cords, and adhering means.

The central portion and the versatile portion each comprise a border edge. The border edge of the central portion is defined as central border, and the border edge of the versatile portion is defined as versatile border.

The versatile border connects to one or numerous versatile border(s) via the fold. The versatile border connects to one or a numerous central border(s) via the fold. The central border connects to one or numerous central border(s) via the fold. The central border connects to one or numerous versatile border(s) via the fold.

The article according to the invention can be configured as a card (such as, for example, a greeting card) from a single flat sheet of material. The sheet comprises a single piece of flat material. The sheet can be made from sheet stock of any appropriate material and appropriate thickness including, but not limited to, paper, cardboard, plastics, minerals, electronic and parchment paper. Typically, the sheet stock is cut to produce the sheet of the required configuration. The sheet stock can be cut by a die-cutting process. The sheet can comprise one or numerous folds.

The three-dimensional form can be provided with a base such that a cavity is defined within the three-dimensional form into which an object such as a gift can be inserted.

Preferably, the versatile portion can be adapted to receive attachment means to allow the assembled article to be attached to a support for display purposes.

In an alternative arrangement, any portion(s) can be adapted to receive attachment means to allow the assembled article to be attached to a support for display purposes.

In alternative arrangements, the attachment means can comprise attachment device(s) such as, but not limited to, at least one magnet for attaching the article to metallic surfaces, such as refrigerator doors or parts of a motor vehicle. In alternative arrangements, the attachments means can comprise a suspension element, such as, but not limited to, a cord by means of which the assembled article can be hung for display. In an alternative arrangement there can be one or numerous threads that can be threaded through one or numerous apertures.

According to a second aspect of the invention, as illustrated in FIG. 3, there is provided an article formed from a single flat sheet of material comprising, a central portion arranged to be transformed into three-dimensional form. The central portion having a lower end and an upper end, wherein the upper end is provided with spaced first and second engagement means such that upon the central portion being turned around upon itself, the first and second engagement means are inter-engaged to transform the central portion into three-dimensional form.

According to a third aspect of the invention, as illustrated in FIG. 6, the central portion either prior to or when erected into the three-dimensional form, can be adapted to receive a weight to enhance the stability of the three-dimensional form when resting on a support surface. The weight can be attached to the rear side of the front face of the central portion when flat, as or when the central portion is erected in the three-dimensional form.

There can be numerous central portions, versatile portions, folds, first engagements, second engagements, cords, apertures and adhering means adapted to represent a variety of art in three dimensional forms.

In an alternative arrangement there can be numerous versatile portions representing candles connected at the first edge of the central portion. The sender can remove the number of candles exceeding the required number for the birthday occasion by cutting same from the first edge at the fold without detracting from the card.

In an alternative arrangement, a versatile portion in the role of a foreground portion, such as in FIG. 17 (18a) can, but is not limited to, be of an upright, oblong shape for the sender (who may be on vacation), to paste their photograph onto versatile portion 18a and then cut around their body outline. When this versatile portion (18a) is lifted into place, it reveals the sender standing in front of an iconic image or tourist attraction. Other means for the sender to have his/her/their photograph(s) in versatile portion (18a) includes, but is not limited to, access to uploading photographs direct onto the article of the greeting card of the invention via electronic means.

In alternative arrangement, an assortment of articles/cards can be arranged as a hanging mobile for a room decoration.

BRIEF DESCRIPTION OF THE DRAWINGS

The invention will be better understood by reference to the following description as shown in the accompanying drawings in which:

FIG. 13 is a side elevation view of an article according to a fifth embodiment, configured as a greeting card in the three dimensional form displaying a versatile portion 18a, forming a base of the greeting card;

FIG. 14 is a side elevation view of an article according to a sixth embodiment, configured as a greeting card in the three dimensional form, displaying the versatility of versatile portion 18;

FIG. 15 is a side elevation view of an article according to a seventh embodiment, configured as a greeting card in the three dimensional form displaying two versatile portions connected via two folds;

FIG. 16 is a side elevation view of an article according to an eighth embodiment, configured as a greeting card, displaying two versatile portions, both portions adapted to be positioned prior to the erection central portion into the three dimensional form;

FIG. 20 is a side elevation view of an article according to a twelfth embodiment, the article being configured as a greeting card displaying a versatile portion 18 folded downwards from upper portion 22 and behind upper portion 22 to provide the background to the erected three-dimensional form;

FIG. 21 is a side elevation view of an article according to a thirteenth embodiment, the article being configured as a greeting card, displaying the versatile portion 18 extending upwards from upper portion 22, and a further versatile portion 18a to provide the background to the erected three-dimensional form;

FIG. 22 is a front side view of an article according to a fourteenth embodiment, the article being configured as a greeting card and being shown in the two-dimensional flat form.

FIG. 23 is a front perspective view of an article according to a fifteenth embodiment, the article being configured as a greeting card and being shown in the erected three-dimensional form.

BEST MODE(S) FOR CARRYING OUT THE INVENTION

Figure 1:
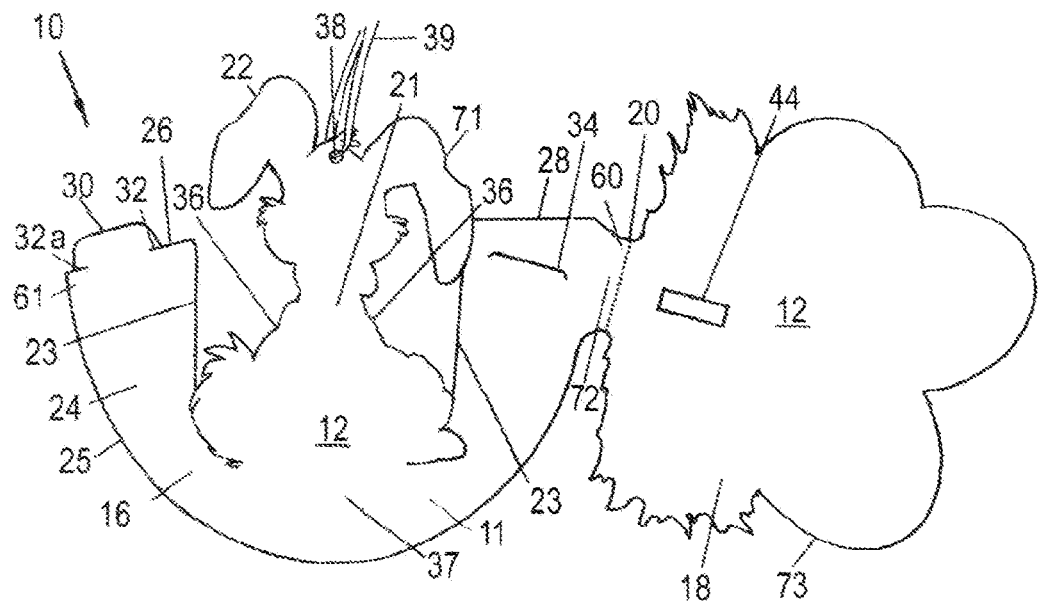
FIG. 1 is a front side view of an article according to a first embodiment, the article being configured as a greeting card and being shown in the two-dimensional flat form.
Figure 2:
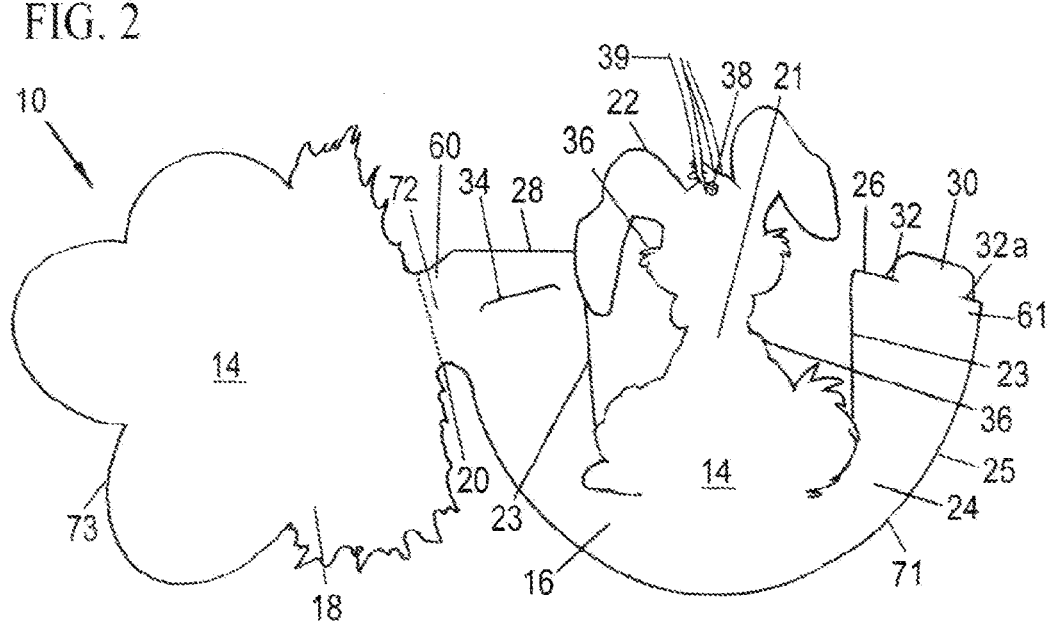
FIG. 2 is a rear side view of the greeting card of FIG. 1 in the two-dimensional flat form.

Referring to the FIGS. 1 to 6 of the drawings, there is shown an article configured as a greeting card 10 according to the first embodiment. The greeting card 10 is illustrated in FIGS. 1 and 2 in two-dimensional form, comprising a sheet 11 having a front side 12 and a rear side 14. The sheet 11 comprises a first portion defined as the central portion 16, a second portion defined as a versatile portion 18 and a fold line defined as fold 20. The versatile portion 18 is attached to the central portion 16 through the fold 20. The central portion 16 and the versatile portion 18 are connected via the fold 20. The central portion 16 and the versatile portion 18 are formed from a single piece of material. The greeting card 10 may be manufactured from a paper stock of suitable thickness. In an alternative embodiment the greeting card may be manufactured from a wide variety of materials, such as, but not limited to, paper, cardboard, plastics, minerals and parchment paper. Typically, the sheet stock is cut to produce the sheet 11 of the required configuration. The sheet stock may be cut by a die-cutting process.

The central portion 16 can be generally of semi-circular shape and comprise an upper section 22, (as seen in the drawings) and a main body section 24. The main body section 24 comprises a curved first edge 25, and a second edge 26 and a third edge 28 disposed on either side of the upper section 22. In order for the greeting card 10 to be erected into a three dimensional form with stable structure, as will be described, the first edge 25 is preferably of a greater length than either of the edges 26 and 28.

The upper section 22 and the main body section 24 are formed integrally, with parts of the two sections. 22 and 24, being integrally connected at junction 21 therebetween, and further parts of the two sections 22 and 24 being detached along character lines 36. The junction 21 is centrally located. The lines of separation 23 are defined by slits in the sheet 11. Character line 36 is defined by a slit in the sheet 11. The lines of separation 23 can be part of or separate to the character line 36. The lines of separation 23 and the character line 36 are formed at the same time as the sheet stock is cut to produce the sheet 11 of the required configuration.

Figure 3:
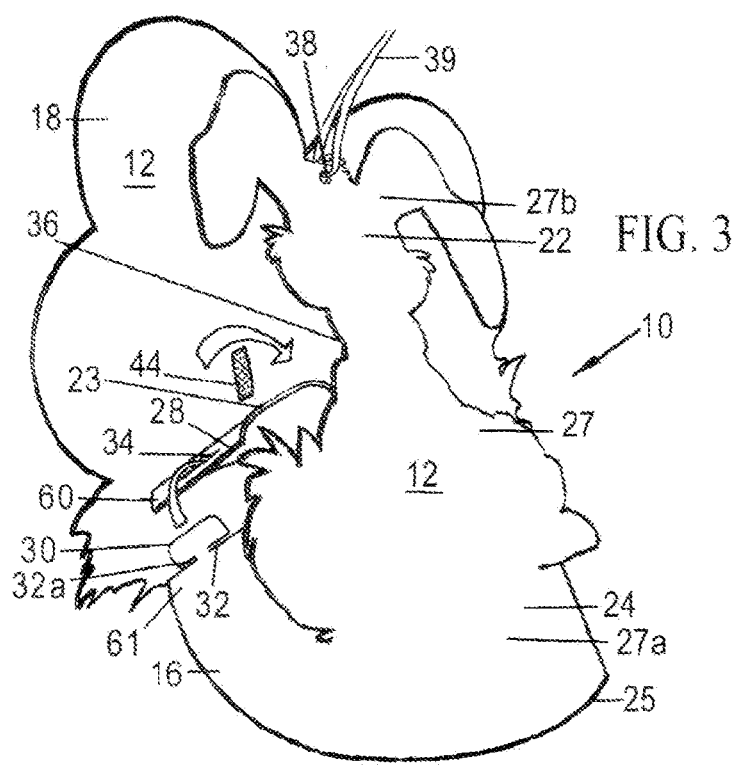
FIG. 3 is a front perspective view of the greeting card of FIG. 1 in the process of being assembled into three-dimensional form.
Figure 5:
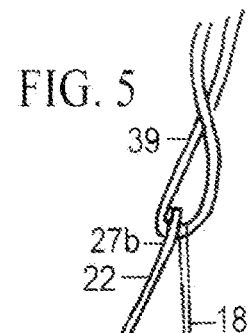
FIG. 5 is a side elevation view of the greeting card as shown in FIG. 4.
Figure 4:
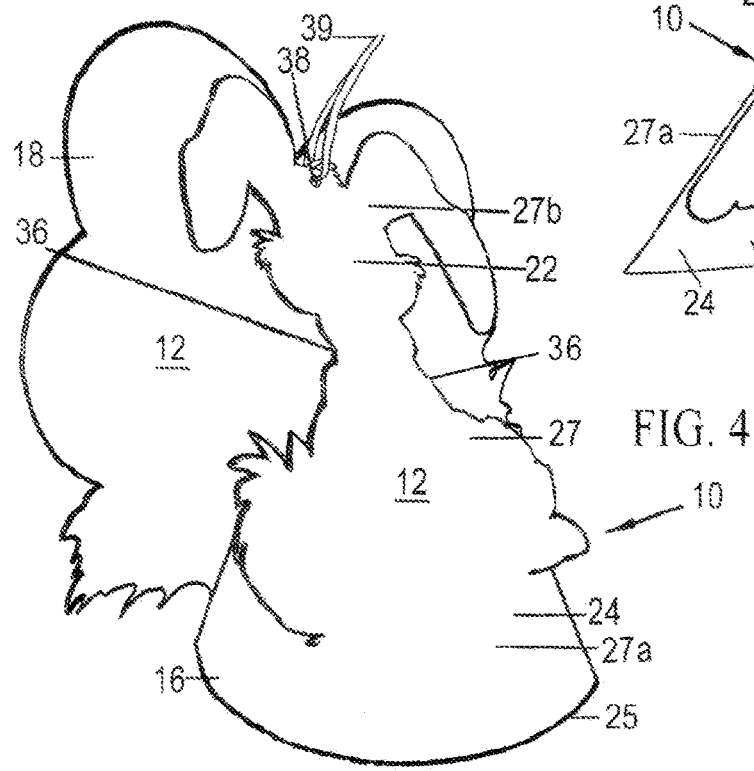
FIG. 4 is a front perspective view of the greeting card of FIG. 1 in the assembled three-dimensional form.

With this arrangement, the upper section 22 and main body section 24 projects from the main body section 24 when the greeting card 10 is erected, as shown in FIGS. 3, 4 and 5. In the arrangement shown the central portion 16, when in the three-dimensional form, portrays a body 27 having a torso 27a and a head 27b, with the upper section 22 forming the head and the main body section 24 forming the upper and lower part of the torso. In this embodiment, the body 27 depicts a rabbit. In an alternative arrangement, the body 27 may depict a differing shape, such as, but not limited to, a steepled church or an aeroplane.

The upper section 22 may be substantially circular in shape. Alternatively, the upper section 22 may be of a differing shape, such as, but not limited to, a square, triangle or oval shape. The upper section 22 may extend widthwise to at least the width of the central portion 16 when in the flat two dimensional form, and extend to at least the height of the central portion 16 when in the flat two dimensional form. The upper section 22 and 24 may include character line 36 in the material so that an appendage portion, such as, but not limited to, a rabbit tail or a basket of eggs may be incorporated.

Located adjacent to the second edge 26 is a tab 30. The tab 30 is formed with notches in the form of slits 32 and 32a in the material at the junction of the tab 30 and the second edge 26. A slot 34 is located adjacent to the third edge 28. The slot 34 is in the form of a slit in the material extending at a spaced location from the third edge 28. The slot 34 is smaller in length than the longest length of the tab 30. The length of the engagement means can be shortened, and lengthened according to the configuration of the card 10.

The central portion 16 further comprises a heel section 72 between the first edge 25 and the slot 34. When the central portion 16, in the three dimensional form, is sitting on a surface, the heel section 72 provides even distribution of weight to the first edge 25, and balance and stability for the three dimensional form.

The greeting card 10 contains the fold 20 at the meeting of the two portions 16 and 18. At the meeting of these two portions 16 and 18 is the first edge 25. In an alternative embodiment of this invention, the versatile portion 18 may be of a differing shape, such as, but not limited to, a circle, square or triangle shape. The fold 20 can comprise part of an edge of the central portion 16 and part of an edge of a further central portion 16. The fold 20 can comprise part of an edge of the versatile portion 18 and part of an edge of a further versatile portion 18. At the meeting of any two portions is the fold.

The central portion 16 has an outer edge defined as central border 71. The versatile portion 18 has an outer edge defined as versatile border 73.

Located on the front side 12 of the versatile portion 18 is an adhering means 44, such as, but not limited to, double sided tape. In an alternative arrangement of this invention, the adhering means 44 may be located on the rear sides and front sides of central portion 16 and versatile portion 18.

In an alternative arrangement of this invention, adhering means 44 may be used to adhere portion to portion. In an alternative arrangement of this invention, adhering means 44 may be used to adhere part of a portion to the same portion.

The greeting card 10 may also contain attachment means to allow the assembled card 10 to be attached to a support for display purposes. Attachment means can comprise attachment means such as, but not limited to, magnets for attaching the assembled card to metallic surfaces such as, but not limited to, doors of refrigerators or parts of motor vehicles.

The front side 12 and rear side 14 may contain a greeting or greetings corresponding to the intended sentiment of the greeting card 10. The greeting card 10 may be supplied with a selection of available messages typically, but not limited to, verse form. In an alternative embodiment of this invention, the greeting card 10 may contain means for the sender to create messages such as, but not limited to, electronic means whereby the message content is uploaded or selected by the sender.

The front side 12 and rear side 14 may also contain any number of designs, markings or slits.

In order to assemble the greeting card 10 as illustrated in FIG. 3, the central portion 16 is turned around on itself such that the linear edges 26 and 28 are brought towards each other in order to form an inverted conical shape with a bottom, the bottom of the conical shape being the first edge 25 and the top of the conical shape being the lines of separation 23 as shown in FIGS. 1, 2, and 3.

The linear edges 26 and 28 are bought together and are orientated such that the tab 30 is over the linear edge 28 adjacent the slot 34. Such orientation allows insertion of the tab 30 into the slot 34 from the front side 14. The tab 30 is presented angularly to the slot 34 to allow the tab to enter the slot. After insertion, the tab 30 is internally located within the greeting card 10.

The front side 12 of versatile portion 18 can then be folded on fold 20 such that the front side 12 of versatile portion 18 is oriented upright and adjacent to the linear edges 26 and 28 of the central portion 16. The versatile portion 18 is then secured to the central portion 16 by adhering means 44.

Remote from the junction of the upper section 22 and main body section 24 is an aperture 38. In use, the aperture 38 may be utilized to hang the assembled card 10 for display purposes. The assembled card 10 may be hung directly on a fixture, such as, a peg or hook or alternatively, the assembled card 10 may be suspended from a cord 39, such as but not limited to, a ribbon or cord threaded through aperture 38. In an alternative embodiment, the cord 39 may be threaded through one or a plurality of aperture 38. This completes the assembly of the greeting card 10.

In an alternative arrangement, prior to the central portion 16 being erected into the three dimensional form, a versatile portion 18a, in the shape of a teddy bear, connected to the first edge 25 of the central portion 16, is folded down, backward and then upward to rest at an angle to the rear side of the central portion 16, whereby when the central portion 16 is erected into the three dimensional form portraying a basket of flowers, the teddy bear 18a appears behind the flowers. A further two versatile portions 18b & 18c, are connected at the first edge 25, one of these versatile portions 18b comprising a spaced first engagement means 30 is connected to the left side of the basket of flowers via the fold 20, and the other versatile portion 18c comprising a spaced second engagement means 34 is connected to the right side of the basket of flowers via the fold 20. The unconnected ends of both these versatile portions 18b & 18c are then folded upwards, brought together over the top of the basket of flowers and engaged by their respective spaced first and second engagement means 30 & 34, to portray handles to the basket of flowers. Folding downward from the basket handle is a further versatile portion 18d being a heart shaped message area. There is a further versatile portion 18e connecting to the uppermost flowers in the basket below the first and second engagement 30 & 34 of the handle. When folded outwards, versatile portion 18e reveals two little butterflies. Furthermore, the first edge 25 of the central portion 16 consists of other numerous versatile portions 18f, 18g, 18h, 18I, 18j, 18k, 18l, 18m and 18n) that when folded upward and adjacent to or at an angle to the central portion 16, represent various flowers and garden fairies. There is a further versatile portion 18o connected to the first edge 25 of the central portion 16 which, when folded upward adjacent to the three dimensional form, represents a background 18 of the sun, blue sky and fluffy white clouds. There is a further versatile portion 18p connected to versatile portion 18o and another versatile portion 18q connected to versatile portion 18p. Versatile portion 18p is smaller and slimmer than versatile portion 18q. When versatile portion 18p is folded forward, and larger versatile portion 18q is folded in front of and parallel to versatile portion 18o, a spray of butterflies fill the sky further enhancing the three-dimensional effect. There is a further slim versatile portion 18r connected to the uppermost edge of versatile portion 18o via two individual folds and a further versatile portion 18s, wider than versatile portion 18o, connected to versatile portion 18r via two individual folds 20. Versatile portion 18r is folded backwards and versatile portion 18s is folded downwards to a position adjacent the rear side 14 of versatile portion 18o with the area wider than versatile portion 18o, distant mountain ranges provide a further background 18s to the background 18o. A further versatile portion 18t, in the role of a base, connected to the first edge 25, when folded downward, backward and then secured adjacent to the bottom end of the central portion 16 in the three dimensional form, provides a base 18t to the three dimensional form. This base forms a cavity 56 for placing, for example, lollies, teeth, money or an engagement ring.

The above alternative arrangement provides an intriguing option to a sender with appetite for creativity and novelty. The greeting card can be sent flat in an envelope likewise provoking intrigue, anticipation and surprise to the recipient with added interactivity and excitement.

Figure 7:
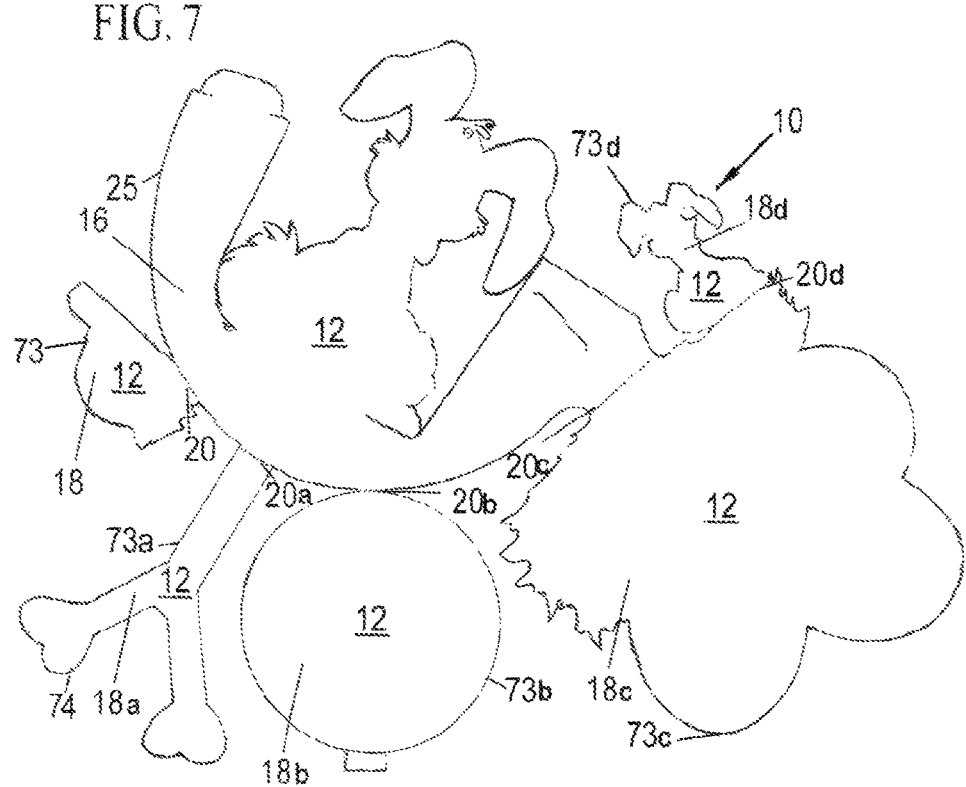
FIG. 7 is a front side view of an article according to a third embodiment, the article being configured as a greeting card consisting of a central portion, numerous versatile portions and numerous folds and being shown in the two-dimensional flat form.
Figure 8:
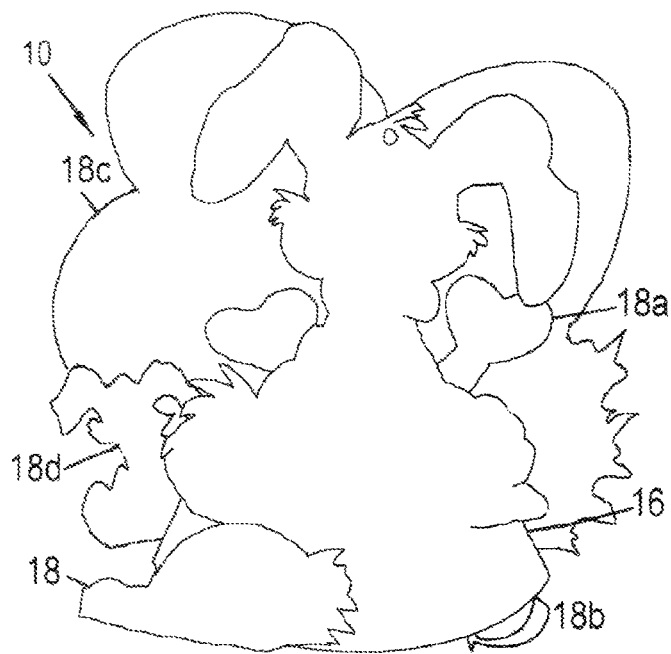
FIG. 8 is a front perspective view of the greeting card of FIG. 7 in the assembled three-dimensional form.

In an alternative embodiment the rear side 14 of versatile portion 18 can then be folded on the fold 20 such that the rear side 14 of versatile portion 18 is oriented adjacent to or at an angle to the rear side 14 of the central portion 16 prior to the central portion 16 being erected into the three-dimensional form, as illustrated in FIGS. 7 and 8 (18a) and 14 (18).

In an alternative embodiment as illustrated in FIGS. 16 (18 and 18a), the rear side of versatile portion 18 may be folded on the fold 20 such that the rear side of versatile portion 18 is oriented adjacent to or at an angle to the bottom end, prior to the central portion 16 being erected into the three-dimensional form.

If so desired, the greeting card 10 may be further folded such that the conical shape of the central portion 16 is flattened, forming a shape such as, but not limited to, a square, triangle or oval shape. In this way the greeting card 10 may be used for other purposes such as, for example, as a bookmark.

Greeting card 10 presents both the sender and recipient with various grades of intrigue, simplicity, complexity creativity, interactivity and is simultaneously, intrinsically alluring.

Alternatively, the assembled greeting card 10 can be simply placed over an object intended as a gift, with the object being accommodated within the confines of the three-dimensional form.

DETAILED DESCRIPTION OF THE DRAWINGS

Figure 6:
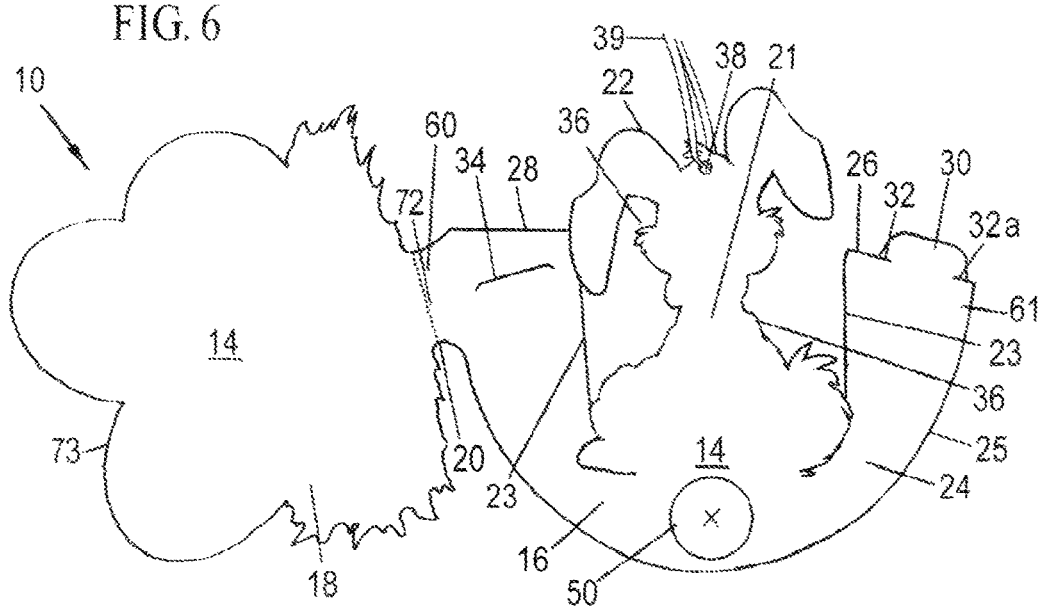
FIG. 6 is a rear side view of the greeting card according to a second embodiment, illustrating a marked location for a weight positioning in the two-dimensional flat form.

FIG. 1 is a front side view of an article according to a first embodiment, the article being configured as a greeting card and being shown in the two-dimensional flat form;

FIG. 2 is a rear side view of the greeting card of FIG. 1 in the two-dimensional flat form;

FIG. 3 is a front perspective view of the greeting card of FIG. 1 in the process of being assembled into three-dimensional form;

FIG. 4 is a front perspective view of the greeting card of FIG. 1 in the assembled three-dimensional form;

FIG. 5 is a side elevation view of the greeting card as shown in FIG. 4;

FIG. 6 According to a second embodiment similar in many respects to the greeting card of the first embodiment and so corresponding reference numerals are used to identify similar parts. In this second embodiment, the central portion 16 is adapted to receive a weight 50 to provide stability to the greeting card 10 when assembled in the three-dimensional form when resting on a support surface such as a shelf. The weight 50 can assist the assembled card to retain its stability when subject to events such as air movement and unintentional knocks. While the weight 50 may take any appropriate form, a coin has been found to be particularly convenient. In the arrangement shown, the rear side 14 has a location marked adjacent the first edge 25 remote from the linear edges 26 and 28 at which the weight 50 can be attached.

FIG. 7 According to a third embodiment of the invention as illustrated in FIG. 7, there is an article comprising a sheet defining a central portion 16, and a versatile portion 18 and a further four versatile portions 18a, 18b, 18c and 18d, connected together. The central portion 16 being adapted for erection into a three-dimensional form, the versatile portion 18 being adapted to the role of a foreground to the central portion 16 in the three-dimensional form, a further versatile portion 18a being adapted to the role of an internal portion 74 to the central portion 16 in the three-dimensional form, a further versatile portion 18b being adapted to the role of a base to the central portion 16 in the three-dimensional form, and a further versatile portion 18c being adapted to the role of a background to the central portion 16 in the three-dimensional form, and a further versatile portion 18d being adapted to the role of a foreground to the versatile portion to 18c in the role of a background to the central portion 16 in the three-dimensional form. The versatile portion 18a, in the role of internal portion 74, is adapted to be folded to a position adjacent to or at an angle to the rear side of the central portion 16 prior to the central portion 16 being erected into the three dimensional form.

FIG. 8 According to the third embodiment of the invention as illustrated in FIG. 7, there is an article comprising a sheet defining a central portion 16, and a versatile portion 18 and a further four versatile portions 18a, 18b, 18c and 18d, connected together.

Figure 9:
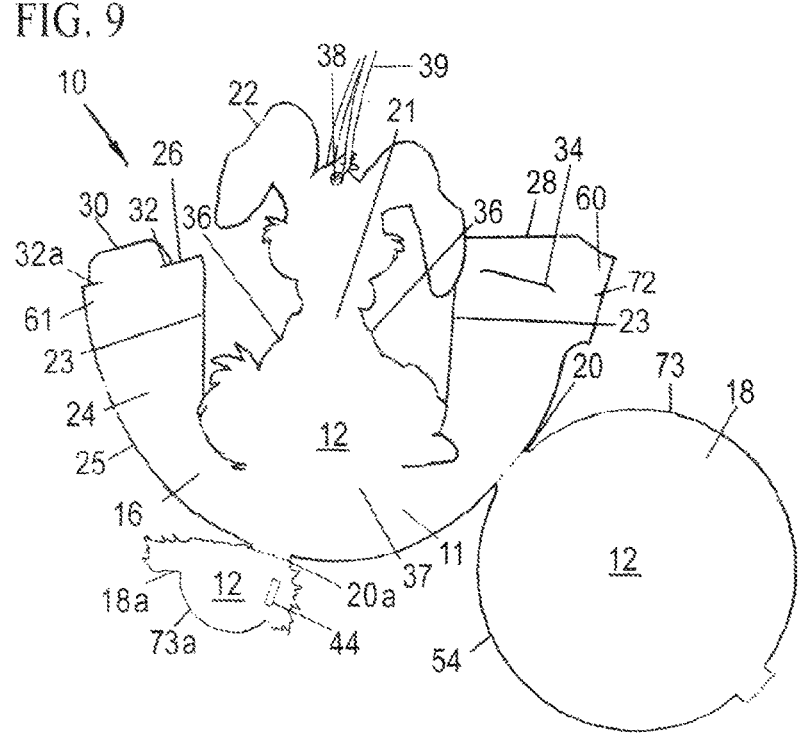
FIG. 9 is a front side view of an article according to a fourth embodiment, configured as a greeting card consisting of a central portion, numerous versatile portions and numerous folds, and being shown in the two-dimensional flat form.

FIG. 9 According to a fourth embodiment of the invention as illustrated in FIG. 9, there is an article comprising a sheet defining a central portion 16, and a versatile portion 18 and a further versatile portion 18a connected together, the central portion 16 being adapted for erection into a three-dimensional form to provide a central portion, and the versatile portion 18 adapted to provide a base 54 to the central portion 16 and the further versatile portion 18a being adapted to provide a foreground to the three-dimensional form. The heel section 72 is also clearly illustrated.

Figure 10:
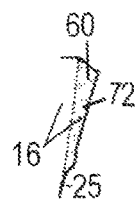
FIGS. 10, 11 and 12 are magnified front side views of alternative variations of the heel portion of the greeting card. See FIG. 9 (72)
Figure 11:
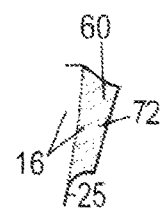
Figure 12:
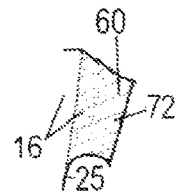

FIGS. 10, 11 & 12 According to the fourth embodiment of the invention as illustrated in FIG. 9, the central portion 16 consists of a heel section 72. When the erected three dimensional form 16 is sitting on a surface, the heel section 72 provides an even distribution of weight to the first edge 25 of the central portion 16 and balance and stability for the three dimensional form 16. The dimensions of the heel 72 are adjusted according to the arrangement of the greeting card 10.

FIG. 13 According to a fifth embodiment of the invention, as illustrated in FIG. 13, there is an article comprising a sheet defining a central portion 16 and two versatile portions 18 and 18a, wherein the fold 20 is at the junction of the two portions 16 and 18. At the junction of these two portions 16 and 18 there is the first edge 25. The first edge 25 comprises a versatile portion 18 that can be folded on fold 20 such that the versatile portion 18 is adapted to provide a background portion to the central portion 16. The first edge 25 of the central portion 16 further comprises a second versatile portion 18a wherein the fold 20a is at the junction of the two portions 16 and 18a. Versatile portion 18a is oriented to provide a base 54 for the interior 56 of the three-dimensional form created upon erection of the central portion 16. With this arrangement, the interior 56 can define a cavity for receiving and containing an object either inserted through the open top 58 or placed into the cavity before the cavity is defined. In this way, a small gift for presentation to the recipient of the card can be accommodated in the cavity. One application to which the card according to this embodiment is particularly suitable is for a child who has lost a tooth. The child can insert the lost tooth in the cavity whereby it can be exchanged later for a coin or other small gift by a "tooth fairy".

FIG. 14 According to a sixth embodiment, of the invention there is an article comprising a sheet defining a central portion, and a versatile portion, and a further versatile portion connected together. The versatile portion (18) as illustrated in FIG. 14, being adapted to be folded to any position from an internal position adjacent to the rear side 14 of the central portion 16 prior to the erection of the three-dimensional form, to a foreground position adjacent to the front side 12 of the first portion 16 when the central portion is erected in the three-dimensional form, whereby, the versatile portion 18 can be folded into a location adjacent to or at an angle to the central portion 16. The further versatile portion 18a being adapted to provide a base 54 to the three-dimensional form 16.

FIG. 15 According to a seventh embodiment of the invention, as illustrated in FIG. 15, there is an article comprising a sheet defining a central portion 16, and a versatile portion 18, and a further versatile portion 18a connected together, the central portion 16 being adapted for erection into the three-dimensional form prior to the versatile portion 18 being adapted to provide a base 54 and the further versatile portion 18a being adapted to provide a background portion 18a to the three-dimensional form 16.

FIG. 16 According to a eighth embodiment of the invention, as illustrated in FIG. 16, there is an article comprising a sheet defining a central portion 16, a versatile portion 18 and a further versatile portion 18a connected together, the versatile portion 18, being adapted to provide a base 54 and the further versatile portion 18a being adapted to provide a background portion prior to the central portion 16 being erected into a three-dimensional form.

Figure 17A:
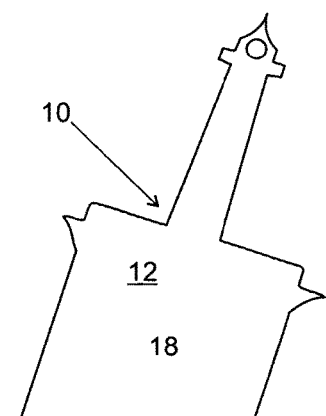
FIG. 17a is a front side view of FIG. 17b, an article according to a ninth embodiment, configured as a greeting card, and being shown in the two-dimensional flat form.
Figure 17B:
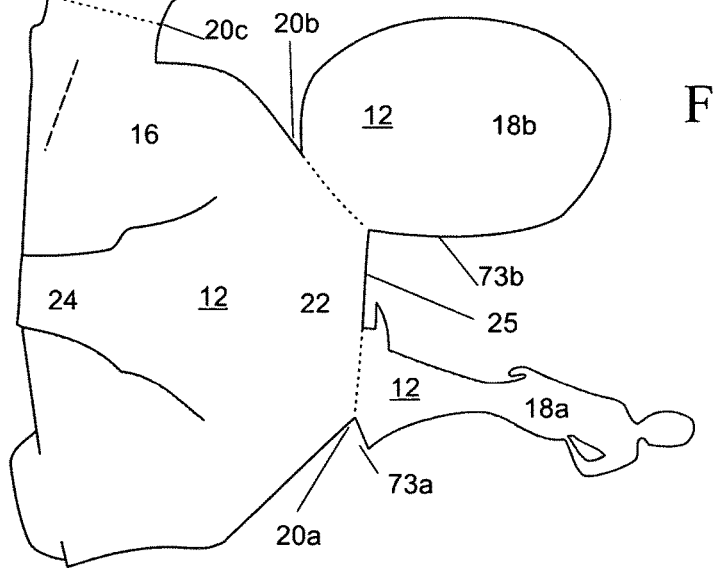
FIG. 17b is a front perspective view of an article according to a ninth embodiment, configured as a greeting card, displaying the central portion and numerous versatile portions 18, 18a and 18b, in the assembled three dimensional form.

FIG. 17a is a front side view of an article according to a ninth embodiment as in FIG. 17b, configured as a greeting card, displaying the central portion, the numerous versatile portions, 18, 18a and 18b and the folds 20, 20a and 20b, in a flat two-dimensional form.

FIG. 17b According to a ninth embodiment of the invention, as illustrated in FIG. 17, there is an article 10 comprising a central portion 16, and a versatile portion 18, and two further versatile portions 18a and 18b connected together via folds 20, 20a and 20b. The central portion 16 is adapted for erection into a three-dimensional form, where the versatile portion 18 in the role of a background is adapted to be adjacent to or at an angle to the central portion 16 in the three dimensional form, and the two further versatile portions, 18a in the role of a foreground, and 18b in the role of a base, are also adapted to be adjacent to or at an angle to the central portion 16 in the three-dimensional form.

Figure 18:
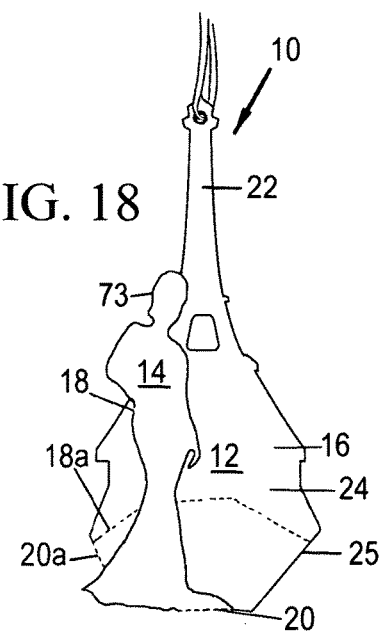
FIG. 18 is a front perspective view of an article according to a tenth embodiment, configured as a greeting card, displaying an alternative arrangement for FIG. 17.

FIG. 18 According to a tenth embodiment of the invention, as illustrated in FIG. 18, there is an article 10 comprising a central portion 16, and a versatile portion 18, and a further versatile portions 18a connected together via folds 20 and 20a. The central portion 16 is adapted for erection into a three-dimensional form, where the versatile portion 18 in the role of a foreground is adapted to be adjacent to or at an angle to the central portion 16 in the three dimensional form, and the further versatile portions 18a in the role of a base, is also adapted to be adjacent to or at an angle to the central portion 16 in the three-dimensional form.

Figure 19:
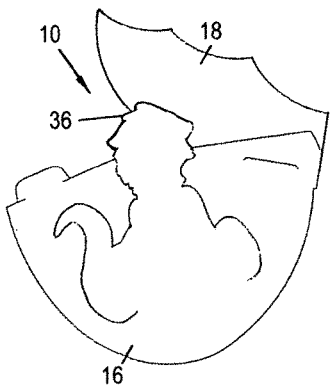
FIG. 19 is a front side view of an article according to an eleventh embodiment, the article being configured as a greeting card and being shown in a folded flat condition in the two-dimensional flat form.

FIG. 19 According to an eleventh embodiment of the invention, as illustrated in FIG. 19, there is an article 10 comprising a central portion 16 and a versatile portion 18 in the two dimensional flat form, and ready for inserting into a standard postal envelope for giving or posting. As described earlier in this application, sections of body 27 can extend widthwise to at least the width of the central portion 16 when the central portion 16 is in the two dimensional flat form and extend to at least the height of the central portion when the central portion 16 is in the two dimensional flat form. In this embodiment FIG. 19, character lines 36 are configured to represent a dragon which, in the two dimensional flat form, the tail can extend to the width of the central portion 16, and in the three dimensional form the tail projects away from the central portion 16, further demonstrating the immense applications of the invention in enabling different uses of art for greeting cards.

FIG. 20 According to a twelfth embodiment of the invention, as illustrated in FIG. 20, there is an article comprising a central portion 16 and a versatile portion 18 connected together, whereby the versatile portion 18 connects to the uppermost part of upper section 22 via fold 20. The versatile portion 18 in the role of a background is then adapted to be folded downwards and adjacent to or at an angle to the central portion 16 in the three dimensional form.

FIG. 21 According to a thirteenth embodiment of the invention, as illustrated in FIG. 21, there is an article comprising a central portion 16 and two versatile portions 18 and 18a connected together via the folds 20 and 20a. Central portion 16 is adapted for erection into a three dimensional form. The versatile portion 18a is adapted for erection adjacent to or at an angle to the three dimensional form. Versatile portion 18 connects to the uppermost part of upper section 22 of central portion 16. Versatile portion 18 is provided for use as a hanging device onto which features such as, but not limited to, information, pictures and calendars can be added to compliment the greeting card.

FIG. 22 According to a fourteenth embodiment of the invention, as illustrated in FIG. 22, there is an article comprising a sheet defining two central portions 16g and 16h, four versatile portions 18g and three versatile portions 18h and further versatile portions 19g and 19h. The workings of FIG. 22 are similar to that of FIG. 7 described earlier in this application with a variation being there are two central portions and a fold connecting the two central portions.

FIG. 23 According to a fifteenth embodiment, as illustrated in FIG. 23, there is an article erected into the three-dimensional form displaying two central portions 16g and 16h connected together via the fold, two versatile portions 18g connected to the central portion 16g via a fold, and two versatile portions 18h, connected to the central portion 16h via a fold.

From the foregoing, it is evident that the various embodiments each provide a simple yet highly creative, versatile and novel greeting card, which can be delivered to an intended recipient in ways similar to conventional cards, but which can be readily assembled into a three-dimensional form to provoke interest, intrigue and to facilitate display.

It should be appreciated that the scope of the invention is not limited to the scope of the various embodiments described.

Modifications and variations as would be apparent to a skilled addressee are deemed to be within the scope of the present invention.

Throughout the specification, unless the context requires otherwise, the word "comprise" or variations such as "comprises" or "comprising", will be understood to imply the inclusion of a stated integer or group of integers but not the exclusion of any other integer or group of integers.

Claims defining the invention are as follows:

1. An article comprising a single flat sheet of material defining at least two portions, a central portion and a versatile portion foldably connected together, whereby
   the central portion
      is adapted for erection into a three dimensional form,
      comprises a first edge, and two opposed second and third edges, shorter than the first edge, whereby the two opposed edges are brought together and a conical shape is formed, furthermore the first edge further comprises a first edge portion and a second edge portion, such that the first edge portion is at one end of the first edge, and the second edge portion is at the extreme other end of the first edge, that when the first edge portion and the second edge portion are brought together, the central portion is erected into the three-dimensional form and is secured by the engagement of spaced first and second engagement means located adjacent the two opposed edges, and
      is foldably connected to at least two versatile portions, whereby
   the versatile portion
      is adapted to be foldably connected to the central portion via a fold, and
      is adapted to be folded to a position adjacent to or at an angle to the front side or rear side of the erected three dimensional form.

2. An article according to claim 1 wherein the three-dimensional form is provided with a base such that a cavity is defined within the three-dimensional form into which an object can be inserted.

3. An article according to claim 1 wherein the central portion comprises at least two sections, parts of the sections being integrally connected and further parts of the sections being detached, whereby one of such sections projects from another of such sections when the central portion is erected into the three-dimensional form.

4. An article according to claim 3 wherein the central portion when in the three-dimensional form portrays, a body having a torso and a head, with said one section forming the head and upper part of the torso, and said another section forming the lower part of the torso.

5. An article according to claim 1 wherein the central portion has an upper section and a main body section, and wherein the main body section is provided with spaced first and second engagement means such that upon the central portion being folded upon itself and the first and second engagement means are inter-engaged to transform the central portion into three-dimensional form.

6. An article according to claim 5 wherein the first engagement means comprises a tab and the second engagement means comprises a slot configured to receive the tab.

7. An article according to claim 1 wherein a weight is attached to the particular face of the central portion which is innermost when the central portion is erected into the three-dimensional form.

8. An article according to claim 1 wherein at least one further versatile portion is foldably connected to the versatile portion via a fold.

9. An article according to claim 1 wherein at least one central portion is foldably connected to the central portion via a fold.

10. An article according to claim 9 wherein versatile portions are foldably connected to the central portion via a fold.

\* \* \* \* \*